US009014726B1

(12) United States Patent
Foster

(10) Patent No.: US 9,014,726 B1
(45) Date of Patent: Apr. 21, 2015

(54) SYSTEMS AND METHODS FOR RECOMMENDING PHOTOGENIC LOCATIONS TO VISIT

(71) Applicant: Google Inc., Mountain View, CA (US)

(72) Inventor: Andrew Foster, Naremburn (AU)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 13/886,624

(22) Filed: May 3, 2013

(51) Int. Cl.
*H04W 24/00* (2009.01)
*H04W 4/02* (2009.01)
*H04W 64/00* (2009.01)
*G08G 1/0967* (2006.01)

(52) U.S. Cl.
CPC ............... *H04W 4/02* (2013.01); *H04W 64/00* (2013.01); *G08G 1/096716* (2013.01)

(58) Field of Classification Search
CPC ............... H04W 64/00; H04W 8/245; H04L 29/08657; G08G 1/096716
USPC .......... 455/456.5, 456.6, 456.1, 418; 701/516
See application file for complete search history.

(56) References Cited

U.S. PATENT DOCUMENTS

| | | | |
|---|---|---|---|
| 7,680,340 B2 | 3/2010 | Luo et al. | |
| 8,332,429 B2 | 12/2012 | Poirier et al. | |
| 8,736,442 B2 * | 5/2014 | Zazula | 340/539.13 |
| 2004/0044467 A1 * | 3/2004 | Laird | 701/207 |
| 2008/0014964 A1 * | 1/2008 | Sudit et al. | 455/456.1 |
| 2012/0213404 A1 | 8/2012 | Steiner | |
| 2012/0233000 A1 * | 9/2012 | Fisher et al. | 705/14.71 |
| 2012/0313777 A1 * | 12/2012 | Zazula | 340/539.13 |
| 2013/0040660 A1 * | 2/2013 | Fisher et al. | 455/456.1 |

OTHER PUBLICATIONS

Chang et al., "A Scenes-Detection and Recommendation Method Using GPS Information Embedded Photographs from WWW", International Journal of Computer Information Systems and Industrial Management Applications, vol. 3, 2011, pp. 724-729.
Chen et al., "Clues from the Beaten Path: Location Estimation with Bursty Sequences of Tourist Photos", Proceedings of the 2011 IEEE Conference on Computer Vision and Pattern Recognition, Colorado Springs, Colorado, Jun. 20-25, 2011, pp. 1569-1576.
Crandall et al., "Mapping the World's Photos", Proceedings of the 18th International Conference on World Wide Web, Madrid, Spain, Apr. 20-24, 2009, pp. 761-770.

(Continued)

*Primary Examiner* — Danh Le
(74) *Attorney, Agent, or Firm* — Dority & Manning P.A.

(57) ABSTRACT

Systems and methods for recommending photogenic locations to visit are provided. One aspect of the present disclosure is directed to a computer-implemented method for recommending photogenic locations. The method includes receiving a signal indicative of a geographic location at which a client device is located. The method further includes determining whether the geographic location is within a threshold distance from at least one of a plurality of photogenic locations. Each of the plurality of photogenic locations can have been identified by clustering a plurality of photographs based on geographic proximity. The method includes transmitting a prompt to the client device when the geographic location is within the threshold distance from at least one of the plurality of photogenic locations. The prompt can indicate the existence of the at least one photogenic location that is within the threshold distance from the geographic location.

9 Claims, 6 Drawing Sheets

(56) References Cited

OTHER PUBLICATIONS

Hoashi et al., "Constructing a Landmark Identification System for Geo-Tagged Photographs Based on Web Data Analysis", IEEE International Conference on Multimedia and Expo, New York, New York, Jun. 28, 2009-Jul. 3, 2009, 2 pages.

Hochmair, "Spatial Association of Geotagged Photos with Scenic Locations", Proceedings of the Geoinformatics Forum Salzburg, Heidelberg, pp. 91-100.

Lu et al., "Photo2Trip: Generating Travel Routes from Geo-Tagged Photos for Trip Planings", ACM Multimedia 2010 International Conference, Firenze, Italy, Oct. 25-29, 2010, pp. 143-152.

Kisilevich et al., "P-DBSCAN: A Density Based Clustering Algorithm for Exploration and Analysis of Attractive Areas Using Collections of Geo-Tagged Photos", Proceedings of the $1^{st}$ International Conference and Exhibition on Computing for Geospatial Research and Application, Washington, DC, Jun. 21-23, 2010, Article No. 38.

Papadopoulos et al., "City Exploration by Use of Spatio-Temporal Analysis and Clustering of User Contributed Photos", Proceedings of the $1^{st}$ ACM International Conference on Multimedia Retrieval, Article No. 65, Trento, Italy, Apr. 18-20, 2011.

Papadopoulos et al., "ClustTour: City Exploration by use of Hybrid Photo Clustering", Proceedings of the International Conference on Multimedia, Firenze, Italy, Oct. 25-29, 2010, pp. 1617-1620.

Platt, "Auto Album: Clustering Digital Photographs using Probabilistic Model Merging", IEEE Workshop on Content-Based Access of Image and Video Libraries, Hilton Head Island, South Carolina, Jun. 12, 2000, pp. 96-100.

Quack et al., "World-Scale Mining of Objects and Events from Community Photo Collections", Proceedings of the 2008 International Conference on Content-Based Image and Video Retrieval, Niagara Fall, Canada, Jul. 7-9, 2008, pp. 47-56.

Ravichandran, "Clustering Photos to Improve Visualization of Collections", A Thesis Paper, 90 pages.

Vajda et al., "Propagation of Geotags Based on Object Duplicate Detection", Applications of Digital Image Processing XXXIII, San Diego, California, Aug. 1-5, 2010, 8 pages.

Yousef et al., "Sunrise: Towards Location Based Clustering for Assisted Photo Management", ICMI '07 Workshop on Tagging and Retrieval of Human-Related Activity Information, Nagoya, Japan, Nov. 14, 2007, pp. 47-54.

Zheng et al., "Mining Interesting Locations and Travel Sequences from GPS Trajectories", Proceedings of the $18^{th}$ International Conference on WWW, Madrid, Spain, Apr. 20-24, 2009, pp. 791-800.

Zheng et al., "Mining Travel Patterns from GPS-Tagged Photos", Proceedings of the $17^{th}$ International Conference on Advances in Multimedia Modeling, Taipei, Taiwan, Jan. 5-7, 2011, pp. 262-272.

Zheng et al., "Tour the World: Building a Web-Scale Landmark Recognition Engine", IEEE Conference on Computer Vision and Pattern Recognition, Miami, Florida, Jun. 20-26, 2009, pp. 1085-1092.

http://googlesystem.blogspot.com/2012/10/google-now-cards-use-gmail-data.html—2 pages.

http://photoephemeris.com/about/—2 pages.

http://www.webpronews.com/google-now-gets-some-new-cards-in-android-4-2-2012-10—6 pages.

* cited by examiner

SYSTEMS AND METHODS FOR RECOMMENDING PHOTOGENIC LOCATIONS TO VISIT

FIELD

The present disclosure relates generally to systems and methods for recommending photogenic locations to visit. More particularly, the present disclosure relates to prompting a mobile device user that a photogenic location is nearby based on clusters of photographs.

BACKGROUND

When vacationing or visiting an unfamiliar location or a familiar location at an unfamiliar time, a person may desire advice regarding popular sites to visit or landmarks to see. In particular, a person may desire advice regarding an interesting view to see or phenomenon to experience.

Travel books or travel guides can provide an indication of popular locations or landmarks within a city or other location. For example, a travel guide may provide information regarding the most popular aspects of a city so that a tourist may be informed of desirable places to visit.

However, such travel guides can be incomplete in the sense that they focus only on significant "tourist-style" landmarks and fail to reflect locations that are popular simply because they offer an interesting view to see or phenomenon to experience. Further, travel guides can become outdated and fail to indicate currently popular locations. In addition, travel guides cost money to purchase and are generally limited to only the specific location for which they are designed.

Another possible solution is to consult online recommendation systems that aggregate reviews or ratings from a plurality of users. However, such recommendation systems almost exclusively focus on businesses such as restaurants. While such systems can be useful for selecting a restaurant in an unfamiliar location, they fail to provide additional, non-commercial knowledge with respect to photogenic locations.

Therefore, improved systems and methods for recommending photogenic locations to visit are desirable.

SUMMARY

Aspects and advantages of the invention will be set forth in part in the following description, or may be obvious from the description, or may be learned through practice of the invention.

One aspect of the present disclosure is directed to a computer-implemented method for recommending photogenic locations. The method includes receiving a signal indicative of a geographic location at which a client device is located. The method further includes determining whether the geographic location is within a threshold distance from at least one of a plurality of photogenic locations. Each of the plurality of photogenic locations can have been identified by clustering a plurality of photographs based on geographic proximity. The method includes transmitting a prompt to the client device when the geographic location is within the threshold distance from at least one of the plurality of photogenic locations. The prompt can indicate the existence of the at least one photogenic location that is within the threshold distance from the geographic location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
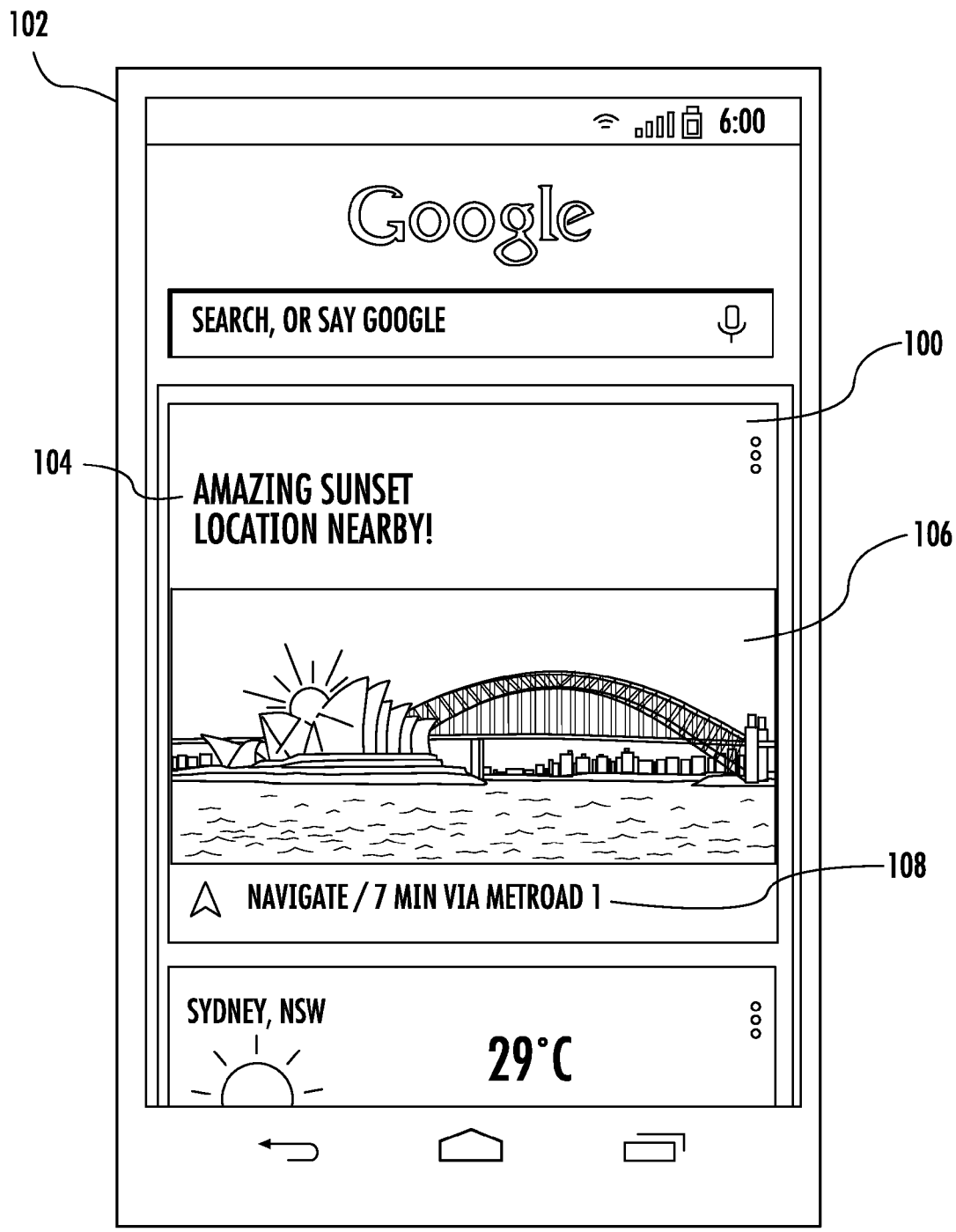
FIG. 1 depicts an exemplary recommendation according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to a system for recommending photogenic locations for a mobile device user to visit. In particular, a database of photographs can be analyzed in order to determine a plurality of geographic locations which correspond to an abnormally large cluster of photographs. Such large clusters of photographs indicate that such locations are photogenic or otherwise desirable to visit. If a user elects to participate, the user's mobile device can repeatedly report its location to the recommendation system and the recommendation system can build a location history profile for such user. When the user is in an area that she is not usually in (e.g. is on vacation or out of her home city) the system can provide a recommendation of a location to visit based on the clusters of photographs. Such recommendation can be delivered to the user via a visual prompt on her mobile device.

According to one aspect of the present disclosure, a plurality of photographs can be retrieved from multiple sources. As an example, a database can be accessed that contains a plurality of geotagged photographs. Such geotagged photographs can be annotated or otherwise include information concerning the location and time of capture of the photograph. For example, a geotagged photograph can include EXIF data indicating a latitude, longitude, date of capture, and a time of capture. Additional photographs can be obtained from the Internet or from other social media or photograph sharing websites. In one implementation of the present disclosure, photographs that are not geotagged with location data can visually compared to photographs of known location in order to determine a location for the untagged photographs.

The plurality of photographs can then be clustered in order to identify a plurality of photogenic locations. For example, the plurality of photographs can be clustered based on geographic proximity to one another. As another example, additional clustering algorithms can be used in order to cluster the plurality of photographs. The result of such clustering can be an index of clustered photographs and each cluster of photographs can be associated with a photogenic location.

According to another aspect of the present disclosure, one or more of the photogenic locations can be recommended to a mobile device user. As an example, if a user provides affirmative consent after being informed of what data is collected, how it is collected, and how such data is used, the user's mobile device can be configured to regularly provide its location to a host server. Such mobile device location can be used to recommend photogenic locations.

As an example, the mobile device location can be compared to the plurality photogenic locations. If the mobile device location is within a threshold distance from at least one of the photogenic locations, then such photogenic location can be recommended to the mobile device user.

In another implementation, a user location history can be built or compiled from the repeated location reports or updates. For example, each location update can include a latitude, longitude, and a timestamp. Then, subsequent mobile device locations can be compared to the user location history. When the mobile device location is inconsistent with the user location history, the most proximate photogenic location can be recommended to the user.

In a further embodiment of the present disclosure, the system recommends locations that provide excellent views of sunrises or sunsets. More particularly, after clustering based of geographic proximity, the database of photographs can be further clustered with respect to an offset from the time of sunrise or sunset at the photograph's location on the day the photograph was taken.

As an example, a sunset offset for each photograph can equal the time of sunset on the date of capture of the photograph at the photograph longitude and latitude minus the time of capture of the photograph, expressed in minutes. In particular, the time of sunset on the date of capture of the photograph at the photograph longitude and latitude can be retrieved from a database providing solar information or other suitable sources or calculations.

Locations that exhibit an abnormal number of photographs clustered around a sunset offset or sunrise offset of small magnitude can be assumed to provide an excellent view of sunrises or sunsets. Therefore, the system can recommend such locations to a user via the user's mobile device.

Recommendations of photogenic locations can take the form of a prompt transmitted to a user's mobile device. For example, the prompt can include a photograph that is representative of the view of phenomenon available at the photogenic location. The prompt can provide a headline, description, or directions from the user's current location to the photogenic location.

Further aspects of the present disclosure relate to scoring the photographs or photogenic locations for presentation to the user based on social media signals or other signals describing online activity, determining a prompt response rate, and determining whether a user that indeed visited the suggested location took additional photographs.

Furthermore, a general subject matter or keyword for each cluster of photographs can be determined (e.g. 'architecture,' 'nature,' 'sports'). User customization can be performed either by the user or through an automated process that incorporates various signals, including social media signals. Thus, the prompts provided to each user can be tailored to reflect such user's interests.

Importantly, in situations in which the systems and method discussed herein collect information about users, such as position data, location history, user photographs or social media activity, the users may be provided with an opportunity to control whether programs or features collect such information. In particular, such information is not collected or used unless the user provides consent after being informed of what data is collected and how such data is used. Further, the user can be provided with a tool to revoke or modify the scope of permissions. In addition, certain information or data can be treated in or more ways before it is stored or used, so that personally identifiable information is removed.

Exemplary Recommendation

FIG. 1 depicts an exemplary recommendation 100 according to an exemplary embodiment of the present disclosure. In particular, FIG. 1 depicts an exemplary recommendation 100 as displayed on the display of a mobile device 102.

Recommendation 100 can recommend a photogenic location that a user of mobile device 102 may wish to visit. For example, recommendation 100 can be a prompt that notifies the user of mobile device 102 as to the existence of a nearby photogenic location. As depicted in FIG. 1, recommendation 100 can take the form of a card or other display item that can be presented to the user.

In one implementation, recommendation 100 is pushed from a host server to mobile device 102 within the context of a mobile device application stylized as a personal assistant. However, in other implementations, recommendation 100 is provided to mobile device 102 by means of electronic mail, SMS technology, or any other suitable communication mechanism or mode of operation.

Recommendation 100 can include a title or headline 104. Headline 104 can indicate the identity of the photogenic location or other desirable information, including the particular type of view that can be seen or phenomenon that can be experienced at the photogenic location being recommended. For example, headline 104 can indicate, as depicted in FIG. 1, that the photogenic location provides an excellent viewpoint for sunsets. As another example, headline 104 can indicate that the photogenic location is associated with a waterfall, historic structure, or other suitable subject matter indicators.

In addition, recommendation 100 can include a photograph 106 that is representative of the view that can be seen or phenomenon that can be experienced at the photogenic location being recommended. As will be discussed further with respect to FIG. 3, photograph 106 can be selected from all photographs associated with such photogenic location based on one or more external signals, such as social media or other signals.

Recommendation 100 can further include one or more interactive elements. For example, recommendation 100 can include a navigation link 108. If the mobile device user selects navigation link 108, the mobile device 102 can provide navigational display or directions in order to navigate the user to the photogenic location being recommended. As shown in FIG. 1, navigation link 108 can provide an estimated travel time, distance, or routing.

One of skill in the art will appreciate that the particular depiction of recommendation 100 provided in FIG. 1 is exemplary in nature. As such, various interactive or non-interactive elements can be included in recommendation 100 without deviating from the scope of the present disclosure. For example, a plurality of photographs can be included recommendation 100 rather than a single photograph 106. As another example, recommendation 100 can display a single photograph at a time, but allow a user to view several representative photographs when the user provides left or right slide gestures on the display.

As yet another example, recommendation 100 can include a user-selectable link or otherwise result in mobile device 102 loading or accessing a social media landing page, comment page, rating page, feedback mechanism, or any other desired additional content, feature, or application. Furthermore, recommendation 100 can be customized according to user preferences associated with the user of mobile device 102 or with mobile device 102 itself.

Exemplary Depiction of Photograph Clusters

Figure 2:
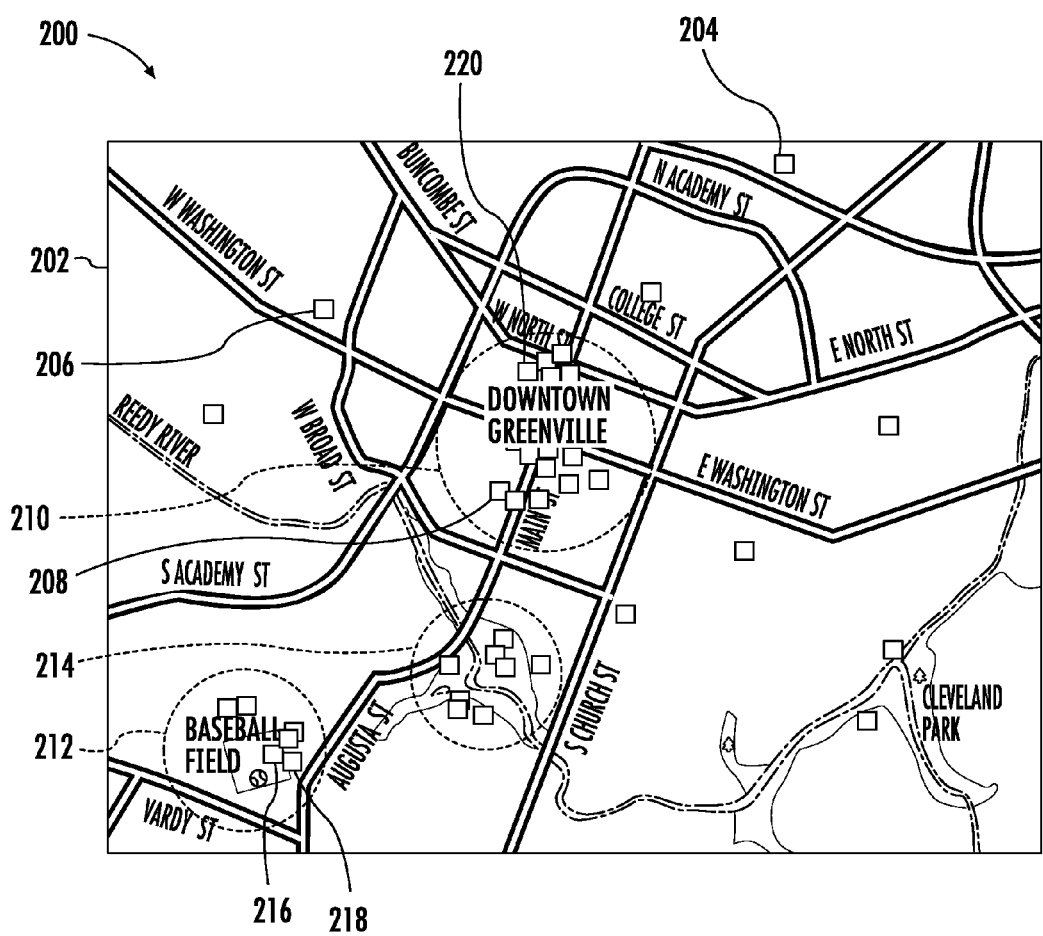
FIG. 2 depicts exemplary photograph clusters according to an exemplary embodiment of the present disclosure.

FIG. 2 provides an exemplary depiction 200 of photographs and photograph clusters according to an exemplary embodiment of the present disclosure. In particular, depiction 200 shows a geographic area 202. A plurality of photographs are respectively associated with a plurality of locations contained within geographic area 202, including photographs 204, 206, and 208. One of skill in the art will appreciate that depiction 200 is simplified for the purpose of illustrating and explaining the present subject matter.

Photographs 204, 206, and 208 can be sourced from a plurality of different locations. As an example, photographs 204, 206, and 208 can be retrieved or accessed from a database storing a plurality of geotagged photographs. Geotagged photographs can be annotated or otherwise include information concerning the location and time of capture of the photograph. For example, a geotagged photograph can include EXIF data indicating a latitude, longitude, date of capture, and a time of capture. An exemplary source of geotagged photographs can be Panoramio™, a geolocation-oriented photograph sharing website.

Photographs 204, 206, and 208 can also be sourced from social media platforms or other photo-sharing websites. For example, a user of a social media platform can upload or share a photograph of a particular location or phenomenon. Such shared photograph can be geotagged. Alternatively, the user that uploaded the photograph can publish or otherwise allow the time and location of the posting to be shared along with the photograph. In some instances, such time and location of posting can be assumed to correspond to the time of capture and the location of capture of the shared photograph. If the social media user consents after being informed of what data is collected, how it is collected, and how such data is used, the user's photograph and any other appropriate data can be retrieved, accessed, or stored in order to perform aspects of the present disclosure. Thus, photographs will not be used without permission. In addition, as will be discussed further with respect to FIG. 3, one or more signals concerning online activity with respect to the shared photograph can be received or analyzed. In particular, the degree to which the photograph is positively received among the social media community can be analyzed.

As another similar or overlapping example, photographs 204, 206, and 208 can also be photographs sourced, accessed, or retrieved from a geographic information system. A geographic information system can provide for the archiving, retrieving, and manipulation of geospatial data that has been indexed and stored according to geographic coordinates, such as latitude, longitude, and altitude coordinates. A geographic information system can combine geospatial data such as satellite imagery, photographs, maps, models, tables, and other geospatial data with Internet search capability so as to enable a user to view imagery of the planet (e.g. as a portion of a virtual globe) and related information (e.g., locales such as islands and cities; and points of interest such as local restaurants, hospitals, parks, hotels, and schools). As an example, users can contribute photographs to the geographic information system. Such contributed photographs can be geotagged. Alternatively, the user can provide geographic location information at the time of contribution.

A geographic information can also provide street level panoramic images that provide to a user with an immersive 360° panoramic viewing experience centered about a particular geographic location. In particular, street level panoramic images can include images captured by cameras positioned at or near the ground level or street level and then stitched together to form the panorama. Such images can be sourced, retrieved, accessed, or stored in order to perform aspects of the present disclosure. Further, a geographic location can be confirmed or provided for user-contributed photographs based on visual feature matching with respect to the images used to create the panoramas.

Photographs 204, 206, and 208 can also be geographically located by means of matching one or more visual features with photographs having a known location. For example, a geographic location can be determined for a photograph 216 by matching one or more visual features shared by a photograph 218. In particular, photograph 218 can be a geotagged photograph. Thus, if one or more visual features can be matched between photograph 216 and photograph 218 with a satisfactory degree of confidence, then photograph 218's location data can be assigned, shared, or attributed to photograph 216.

Such visual feature matching can also be used to confirm otherwise ambiguous geotagged photographs. For example, all photographs within a cluster 212 can be analyzed through visual feature matching to confirm that such photographs are correctly geotagged and associated with the location associated with cluster 212. Visual feature matching between photographs can be performed according to any known method. For example, visual features to be matched can include color profile, textures, wavelets, geometry, objects, or other visual features.

According to another aspect of the present disclosure, a plurality of photographs can be clustered in order to determine or identify a plurality of photograph clusters. For example, the plurality of photographs depicted in FIG. 2 can be clustered based on geographic proximity. The result of such clustering can be clusters 210, 212, and 214. While such clustering can be performed on any appropriate scale, the metropolitan scale or smaller is preferably used in order to provide clusters that represent distinct viewpoints, physical locations, or items of interest. A cluster that exhibits a large number of photographs can be assumed to be a photogenic or popular location to visit.

As shown in FIG. 2, clusters 210, 212, and 214 can respectively contain or include a plurality of photographs associated with a particular geographic location. For example, photograph 208 can be a member of cluster 210. However, there may not be sufficient photographs associated with a particular geographic location to form a cluster. For example, photographs 204 and 206 are not members of a cluster. Although clusters 210, 212, and 214 are depicted in FIG. 2 as respectively defined by a circular geographic area, clusters can alternatively be defined with respect to the photographs they contain, for example, similar to a mathematical set being defined by the elements it contains.

One of skill in the art will appreciate that there are various methods that can be used to analyze a plurality of photographs in order to generate or identify photograph clusters, any of such methods can be used to satisfy the present disclosure so long as the output of such method is one or more clusters of photographs that are associated with a particular geographic location.

As an example, suitable clustering algorithms can take into account attributes such as photograph density. In particular, a density map can be computed and areas with the highest density can be identified as clusters. Alternatively, points in high density areas can be treated as seeds for clusters and the clustering algorithm can work outwards from such seeds to incorporate photographs in a cluster based on a plurality of factors.

As another example, suitable clustering algorithms can take into account or require that a cluster exhibit user diversity (i.e. contain photographs uploaded or contributed by more than one user). Requiring user diversity ensures that a cluster of photographs is not determined based upon photographs uploaded or contributed by only a single user as and therefore decreases susceptibility to false identification of a photogenic location.

As yet another example, suitable clustering algorithms can consider textual content such as metatags, keywords, text annotations, or comments provided in the context of a sharing or social media platform. In particular, textual content can describe the subject matter of the associated photograph. As such, a clustering algorithm can analyze textual content in order to determine whether a photograph should be clustered with other photographs that contain similar textual content or depict the same subject matter. Furthermore, textual content can be used to determine a geographic location for a photograph that has an otherwise ambiguous location by matching the textual content with that of other photographs.

Thus, geographic clustering can be performed with respect to a number of parameters, including geographic location, density, user diversity, textual content, feature matching, or any other suitable parameters. The result of such geographic clustering can be a plurality of clusters, such as clusters 210, 212, and 214.

Clusters 210, 212, and 214 can be associated with or assigned a geographic location. For example, the geographic location assigned to cluster 212 can be the average location of its photograph members. As another example, the geographic location assigned to cluster 212 can be the geographic center of a circular area which includes of the cluster's photograph members.

As yet another example, the geographic location assigned to cluster 212 can be identified by determining the point of interest or landmark that is depicted by or associated with the photographs included within cluster 212. For example, if the photographs in cluster 212, such as photographs 216 and 218, overwhelmingly depict a baseball stadium, then the geographic location assigned to cluster 212 can be the geographic location of the baseball stadium, regardless of the exact geographic location of the photographic members of cluster 212. Such determination with respect to subject matter can be performed by textual analysis, visual feature matching, or by generally comparing the geographic location of photographs with respect to geospatial data such as, for example, data included in a geographic information system.

After geographic clustering is performed, clustering based on visual feature matching can optionally be performed. Performing clustering based on visual feature matching after clustering based on geographic proximity can segment a single cluster, such as cluster 210, into a plurality of subclusters.

For example, photograph 208 and a photograph 220 can both be members of cluster 210. However, photograph 208 and photograph 220 can respectively depict distinct subject matter. For example, photograph 208 could depict a historic courthouse while photograph 220 depicts a popular artistic sculpture. Therefore, subclustering based on visual feature matching can optionally be performed in order to result in clusters or subclusters that more accurately reflect or are associated with single subject matter, viewpoint, or phenomenon.

According to a further aspect of the present disclosure, after clustering based of geographic proximity, the plurality of photographs can be further clustered or subclustered with respect to an offset from the time of sunrise or sunset at the photograph's location on the day the photograph was taken.

As an example, a sunset offset for each photograph can equal the time of sunset on the date of capture of the photograph at the photograph longitude and latitude minus the time of capture of the photograph, expressed in minutes. In particular, the time of sunset on the date of capture of the photograph at the photograph longitude and latitude can be retrieved from a database providing solar information or can be obtained from other suitable sources or calculations.

For example, photograph 204 can include data indicating that photograph 204 was taken on Dec. 25, 2012 at 5:20 PM at a particular latitude and longitude. In order to determine the sunset offset for photograph 204, the time of sunset on Dec. 25, 2012 at such particular latitude and longitude can be retrieved or obtained from a solar information data source. Thus, if the time of sunset was determined to be 5:25 PM, then the sunset offset for photograph 204 can be 5 minutes. As another example, if photograph 204 indicated it was taken at 5:30 PM instead of 5:20 PM, then the sunset offset for photograph 204 can be −5 minutes.

Alternatively, the sunset offset for each photograph can equal the absolute value of the time of sunset on the date of capture of the photograph at the photograph longitude and latitude minus the time of capture of the photograph, expressed in minutes. Thus, to continue the example provided above, if photograph 204 indicated it was taken at 5:30 PM and the time of sunset for such location on the date of capture was 5:25 PM, then the sunset offset would equal 5 minutes. The sunset offset if photograph 204 was taken at 5:20 PM would be 5 minutes as well.

One of skill in the art will appreciate that the same or similar techniques can be used to determine a sunrise offset as well.

As noted above, the plurality of photographs can, after being clustered based on geographic proximity, be further clustered or subclustered with respect to such a sunset or sunrise offset. For example, all photographs in cluster 210 can be clustered based on their respective sunset offsets, thus generating or identifying a plurality of sunset offset subclusters.

Further, while subclustering based on a sunset offset value has been provided as an illustrative example herein, subclustering can be performed in accordance with the present disclosure based on other solar offset values for each photograph including, without limitation, a sunrise offset value; an average of the sunset offset value and the sunrise offset value; the minimum of either the sunset offset value or the sunrise offset value; or other suitable values.

Locations that exhibit a significant number of photographs clustered around a sunset offset or sunrise offset of small magnitude can be assumed to provide an excellent view of sunrises or sunsets, and therefore recommended to a user via a prompt transmitted to the user's mobile device.

As an example, in one implementation, geographic photo clusters can be identified that include an offset subcluster that includes photographs with a sunset offset value less than a threshold value and includes a larger number of photographs than any of the other offset subclusters included in such geographic photo cluster. For example, the plurality of photographs included in geographic photo cluster 214 can be subclustered with respect to their respective sunset offset values. Cluster 214 can thereafter contain a plurality of offset subclusters. If one of such subclusters includes photographs with a small sunset offset value (i.e. less than a threshold value) and such subcluster also contains a larger number of photographs than any of the other offset subclusters from cluster 214, then the photogenic location associated with cluster 214 can be assumed to provide an excellent viewpoint for viewing sunsets and recommended as such to a user.

In another implementation, one or more geographic photo clusters can be identified that include a relatively large number of photographs that exhibit a sunset offset value below a threshold value. For example, the percentage of photographs included in cluster 214 that exhibit a sunset offset value below a threshold value can be determined. If such percentage is relatively large or exceeds a threshold percentage, then the photogenic location associated with cluster 214 can be assumed to provide an excellent viewpoint for viewing sunsets.

As an example, if greater than thirty percent of the photographs contained in cluster 214 exhibit a sunset offset value of magnitude less than twenty minutes, while clusters 210 and 212 have only five and eight percent photographs that meet such criteria, then cluster 214 can be identified as a geographic photo cluster that includes a relatively large number of photographs that exhibit a sunset offset value below a threshold value.

According to another aspect of the present disclosure, a global interestingness score can be determined for each of the plurality of photographs and each of the plurality of clusters. In particular, a global interestingness score can be determined for each of the plurality of photographs based on one or more signals indicative of online activity associated with such photograph.

For example, a signal from one or more social media platforms can be used to determine a global interestingness score for each photograph. Social media platforms provide for interaction among people. Users can create, share, exchange, or comment on content. Such content can be textual, videographic, photographic, or other suitable formats. Social media platforms can include forums, weblogs, microblogging, wikis, or other social media networks for sharing photographs, videos, and/or textual commentary.

Importantly, however, a social media user's activity and content will not be accessed or used unless such social media user has provided consent after being informed what data is collected, how such data is collected, and how such data is used. In addition, a social media user can be provided with a tool to revoke or change the scope of permissions. Thus, activity and content is not used without permission.

The signal from the one or more social media platforms can describe online activity associated with each of the plurality of photographs. As an example, photograph 218 can have been sourced from a social media network or can have been posted to a social media network. A signal can be received that indicates the number of instances in which one or more users of such social media network has selected an indicator indicating that such social media user enjoys photograph 218. If more users have selected such an indicator, then a global interestingness score determined for photograph 218 can be larger.

As another example, a signal can be received that indicates the number of comments that were provided when photograph 218 was posted or shared on the social media platform. If photograph 218 received or engendered a larger number of comments, then it can be assumed that photograph 218 is generally more interesting. Therefore, a larger global interestingness score can be assigned to photograph 218. Further, the general positivity or negativity of the comments provided can be analyzed and used to influence the global interestingness score.

As yet another example, a social media platform can allow a second user to share or rebroadcast photograph 218. The number of times photograph 218 is shared or rebroadcasted can be indicative of whether photograph 218 generates interest among users of the social media platform. Thus, a larger number of shares or rebroadcasts can correspond to a higher global interestingness score, while a lower number of shares or rebroadcasts can correspond to a lower global interestingness score assigned to photograph 218.

The global interestingness score assigned for a particular cluster can be based on the global interestingness scores respectively associated with the photographs contained in such cluster. For example, the global interestingness score determined for cluster 212 can be the sum of all scores associated with all photographs included in cluster 212, include photographs 216 and 218. As another example, the global interestingness score determined for cluster 212 can be an average of all scores associated with all photographs included in cluster 212. As yet another example, the global interestingness score determined for cluster 212 can be an average of the top five scores for photographs included in cluster 212.

Further, one or more keywords can be determined or assigned to each cluster. For example, the keywords can generally describe the subject matter, viewpoint, or phenomenon that can be experienced at the location associated with such cluster. Such keywords can be determined based on analyzing textual content associated with the photographs included in a cluster or by any other suitable means. As an example, if the metatags or social media comments for the photographs included in cluster 212 repeatedly refer to or use the words "baseball," "stadium," or "sports," then such words can be assigned as keywords to cluster 212.

Exemplary System for Recommending Photogenic Locations

Figure 3:
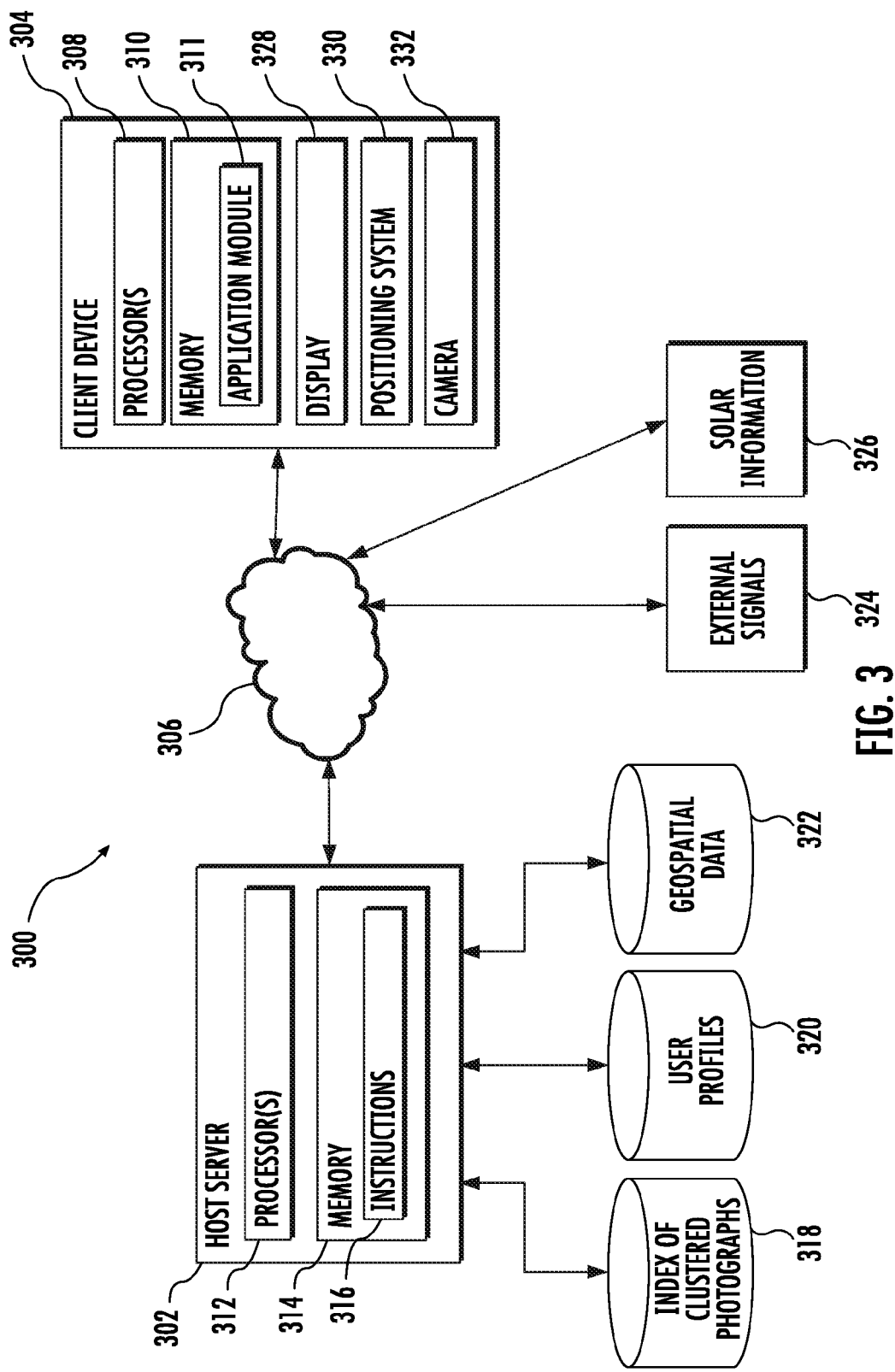
FIG. 3 depicts an exemplary system for recommending photogenic locations according to an exemplary embodiment of the present disclosure.

FIG. 3 depicts an exemplary system 300 for recommending photogenic locations according to an exemplary embodiment of the present disclosure. System 300 can include a client-server architecture, where a host server 302 communicates with one or more client devices 304 over a network 306. Although one client device 304 are illustrated in FIG. 3, any number of client devices 304 can be connected to host server 302 over network 306.

A client device 304 can be, for example, a computing device having a processor 308 and a memory 310, such as a wireless mobile device, a personal digital assistant (PDA), smartphone, tablet, navigation system located in a vehicle, handheld GPS system, laptop computer, or other such devices/systems. In short, although client device 304 is preferably mobile in nature, the client device 304 can be any computer, device, or system that can allow the user to interact with the host server system 302 (sending and receiving data).

Processor 308 of client device 304 can be any suitable processing device and can be one processor or a plurality of processors that are operably connected. Memory 310 can include any number of computer-readable instructions or other stored data. In particular, memory 310 can include, store, or provide an application module 311. When implemented by processor 308, application module 311 can cause or instruct processor 308 to perform operations consistent with the present disclosure, such as, for example, running an application that transmits location data to host server 302, receives photogenic location prompts from host server 302, and displaying such prompt on a display 328 of the client device 304.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 304 can further include a positioning system 330. Positioning system 330 can determine a current geographic location of client device 304 and communicate such geographic location to host server 302 over network 306. The positioning system 330 can be any device or circuitry for analyzing the position of the client device 304. For example, the positioning system 330 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 330 analyzes the position of the client device 304 as the user moves around in the world and provides the user position information to the host server 302 over network 306. It should be understood that location information associated with a client device is utilized only if permission is granted after the user has been notified that location information of the player is to be accessed and how the location information is to be utilized in the context of the recommendation system. In addition, any location information associated with users can be stored, handled, and maintained in a manner to protect user privacy.

Client device 304 can further include a camera 332. Camera 332 can capture or create photographs according to known any camera technology. Such photographs captured by camera 332 can be stored in memory 310. If the user of client device 304 consents after being informed which photographic data is collected, how such data is collected, and how such data is used, then client device 304 can transmit or otherwise provide host server 302 with information concerning the photographs captured by camera 332. Such data can be used to build or supplement a user profile, as will be discussed further below.

Host server 302 can be implemented using one or more suitable computing devices and can include a processor 312 and a memory 314. Processor 312 can be any suitable processing device and can be one processor or a plurality of processors which are operably connected. Memory 314 can store instructions 316 that cause processor 312 to perform operations to implement the present disclosure. Host server can communicate with client device 304 over network 306 by sending and receiving data.

Network 306 can be any type of communications network, such as a local area network (e.g., intranet), wide area network (e.g., Internet), or some combination thereof and can include any number of wired or wireless links. In general, communication between the host server 302 and a client device 304 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, client device 304 can freely move throughout the world and communicate with host server 302 is a wireless fashion.

Host server 302 can be coupled to or in communication with one or more databases, including a database providing an index of clustered photographs 318, a user profile database 320, and a geospatial data database 322. Although databases 318, 320, and 322 are depicted in FIG. 3 as external to host server 302, one or more of such databases can be included in memory 314 of host server 302. Further, databases 318, 320, and 322 can each correspond to a plurality of databases rather than a single data source.

Database 318 can store or provide an index of clustered photographs. In particular, a plurality of photographs can be clustered based upon various attributes. For example, a plurality of photographs can be clustered based upon geographical proximity. The result of such clustering can be a plurality of clusters of photographs, with each cluster being associated with a particular geographic location.

The index of clustered photographs 318 can store or provide the plurality of photograph clusters. For example, the index can provide, for each cluster, the associated cluster location, photograph member data, a global interestingness score, keyword data, subcluster data, and any other suitable data or metadata. Photograph member data for each photograph can include the photograph itself, the photograph location such as latitude and longitude, any textual content associated with the photograph, a global interestingness score associated with the photograph, solar offset values, or any other suitable data or metadata.

The global interestingness scores for each photograph or cluster can be determined based upon one or more external signals 324 received over network 304. For example, external signals 324 can describe online activity with respect to each of the photographs. As discussed above with respect to FIG. 2, external signals 324 can be received from social media platforms or other appropriate services and can be used to generally determine how interesting a photograph is to users of such social media platforms.

User profile database 320 can store or provide one or more user profiles. For example, each client device 304 can be associated with a user. If a user provides affirmative consent after being informed of what data is collected, how it is collected, and how such data is used, a profile describing one or more attributes of each user can be built. Alternatively, such user profile can be associated with the device itself, rather than a user of the device. Such user profile can be stored or provided by user profile database 320.

In particular, one aspect of a user profile can be a user location history. Positioning system 330 can repeatedly determine the current geographic location of client device 304 and client device 304 can repeatedly report such location to host server 302 over network 306. For example, each location update can include a latitude, a longitude, and a timestamp identifying the date and time of day. In some implementations, such location update can further include an accuracy indicator.

Importantly, however, a user can control whether her device reports location updates to the system. In particular, location updates will not be accessed or used unless a user provides consent after being informed of what information is collected, how such information is collected, and how such information is used. Further, a user can be provided with a tool to revoke or modify the scope of permissions grated. Thus, user locations are not analyzed without permission.

The repeated location updates can be stored in user profiles database 320 and can be used to build a user location history for the user of client device 304. Further, one or more patterns can be identified in such user location history. For example, a home city or a home time zone can be identified. As another example, particular locations can be designated as either familiar or non-familiar based upon the amount of time a user has been located in such locations. Host server 302 can access the user profile database 320 in order to make decisions regarding if and when to recommend photogenic locations to a user and, further, which photogenic location to recommend.

Other aspects of a user profile can describe one or more user interests. For example, if a user provides affirmative consent after being informed of what data is collected, how it is collected, and how such data is used, a user's social media activity can be analyzed in order to determine categories of content in which the user is interested. Thus, if a user repeatedly comments on photographs or articles with content relating to sporting events, then sports can be identified in the user profile as a user interest. As another example, if a user repeatedly captures and/or uploads photographs relating to animals, then animals can be identified in the user profile as a user interest. In one implementation, the user profile can include a user interest table storing or providing a list of keywords describing identified interests of such user (e.g. the keyword "sports"). The host server 302 can prefer to recommend photogenic locations that share a keyword with such a user interest table.

Geospatial data database 322 can store or provide geospatial data to be used by host server 302 and/or a geographic information system. Exemplary geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geospatial data can be used by host server 302 to provide navigational directions, determine points of interest associated with photographs or clusters of photographs, interpret patterns in a user location history, or any other suitable use or task.

Host server 302 can further access solar information 326 over network 306. Exemplary solar information can include the sunrise and/or sunset times for a particular latitude and longitude on a particular date. Host server 302 can use solar information 326 to determine solar offset values, such as, for example, a sunrise offset value and a sunset offset value, for each photograph included in database 318. In such fashion, the index of clustered photographs provided by database 318 can provide photographs clustered or subclustered around one or more solar offset values.

Exemplary Method for Recommending a Photogenic Location

Figure 4:
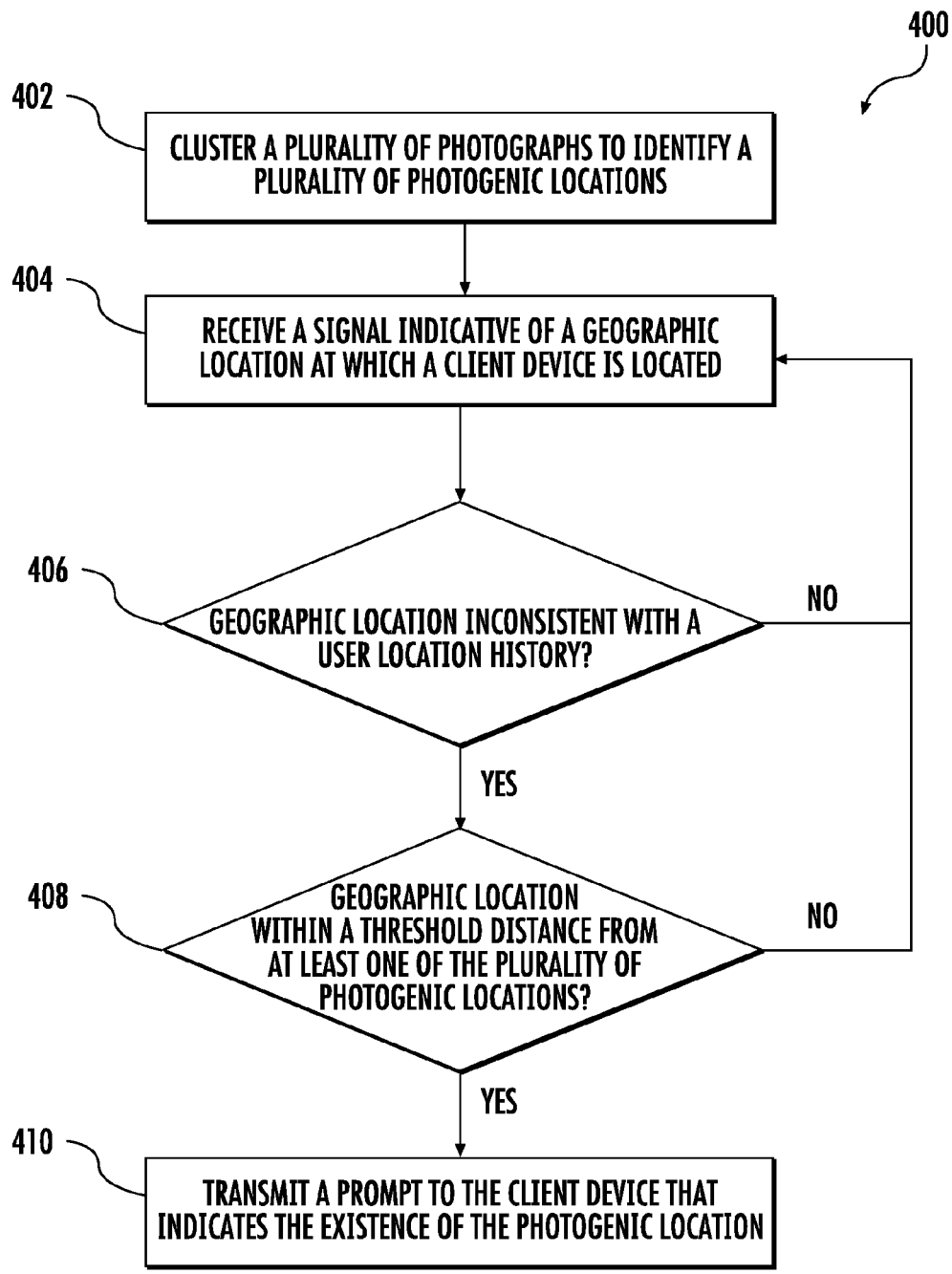
FIG. 4 depicts a flowchart of an exemplary method for recommending a photogenic location according to an exemplary embodiment of the present disclosure.

FIG. 4 depicts a flowchart of an exemplary method (400) for recommending a photogenic location according to an exemplary embodiment of the present disclosure. While exemplary method (400) will be discussed with reference to the system 300 of FIG. 3, method (400) can be implemented using any suitable computing system. In addition, although FIG. 4 depicts steps performed in a particular order for purposes of illustration and discussion, methods of the present disclosure are not limited to such particular order or arrangement. One skilled in the art, using the disclosures provided herein, will appreciate that various steps of the method (400) can be omitted, rearranged, combined, and/or adapted in various ways without deviating from the scope of the present disclosure.

At (402) a plurality of photographs are clustered in order to identify a plurality of photogenic locations. The plurality of photographs can have been obtained from any suitable source or location, including, without limitation, a database storing geotagged photographs, a social media platform, or a geographic information system. Each of the plurality of photographs can be geotagged with geographic location data or geographic location data can be determined for such photograph based on textual, visual, or contextual analysis.

The plurality of photographs can be clustered based on geographic proximity. Suitable clustering algorithms can consider photograph density, user diversity, textual content, visual content, or other suitable parameters. In addition, prior to clustering, the plurality of photographs can be filtered based on one or more parameters. The result of such clustering can be a plurality of geographic photo clusters respectively associated with a plurality of photogenic locations. For example, an index of clustered photographs can be created and stored in a database such as, for example, database 318 of FIG. 3.

At (404) a signal is received that is indicative of a geographic location at which a client device is located. For example, if a user provides consent, client device 304 can operate its positioning system 330 to determine its current geographic location. Client device 304 can transmit such geographic location to host server 302 over network 306. Such signal can further indicate a time of day, date, or day of week.

At (406) it is determined whether the geographic location of the client device received at (404) is inconsistent with a user location history. The user location history can be associated with a user of the client device (i.e. a user ID) or the user history location can be associated with the client device itself. In particular, if a user provides affirmative consent after being informed of what data is collected, how it is collected, and how such data is used, the client device can be configured to repeatedly provide location updates to a host server. Each location update can include, for example, a latitude, a longitude, and a timestamp indicating the date and time of day. A user location history can be built from such repeated location updates.

In particular, the plurality of location updates can be analyzed and one or more patterns can be identified. For example, a home city, home time zone, or other patterns can be identified. Further, one or more locations can be designated as familiar or non-familiar based on a total amount of time or relative frequency at which the user or device visits such location.

Thus, at (406) the geographic location received at (404) is compared with such a user location history. If the geographic location is inconsistent with the user location history, then method (400) proceeds to step (408). However, if the geographic location is not inconsistent (i.e. is consistent) with the user location history, then method (400) returns to step (404) and awaits the next signal indicative of a geographic location.

Generally, a geographic location will be inconsistent with a user location history when it indicates that the user is in a location that the user does not usually visit. In particular, even if the user is familiar with such location, he or she may not visit at certain times of day.

As an example, the geographic location received at (404) can be compared to the user location history by analyzing the user location history with respect to a window of time around the time of day for each instance of the day of the week of the signal received at (404). For example, if the client device indicates that it is located at Location A on a Monday at 6:00 PM, then the user location history can be analyzed with respect to all Mondays between 5:00 PM and 7:00 PM. In particular, a degree of novelty or inconsistency can be analyzed. For instance, if the user location history indicates that the user has been to Location A within such time window once per month over the last year, then such location is more consistent with the user location history than, for example, if the user has been to Location A within such time window only once in the last year. One of skill in the art will appreciate that such time windows can be adjusted with respect to either time of day, day of week, or any other suitable factors or parameters.

As another example, the geographic location received at (404) can be inconsistent with the user location history if the user has visited such geographic location less than a threshold number of times. As yet another example, the geographic location received at (404) can be inconsistent with the user location history if such geographic location is located out of a home time zone, home city, or home region determined with respect to the user location history. As another example, the geographic location received at (404) can be inconsistent with the user location history if the user has visited such geographic location at a frequency that is less than a threshold frequency.

At (408) it is determined whether the geographic location received at (404) is within a threshold distance from at least one of the plurality of photogenic locations identified at (402). For example, database 318 can provide an index of clustered photographs. Such index can include the plurality of photogenic locations respectively associated with a plurality of photograph clusters. In particular, each photogenic location can be associated with a geographic location, such as a latitude or longitude. The geographic location received at (404) can be compared with locations included in the index of clustered photographs to determine whether it is within a threshold distance from at least one the plurality of photogenic locations.

If it is determined at (408) that the geographic location received at (404) is not within a threshold distance from at least one of the plurality of photogenic locations identified at (402) then method (400) returns to step (404) and awaits the next signal indicative of a geographic location at which the client device is located. However, if it is determined at (408) that the geographic location received at (404) is within a threshold distance from at least one of the plurality of photogenic locations identified at (402) then method (400) proceeds to step (410).

At (410) a prompt or recommendation is transmitted to the client device that indicates the existence of the photogenic location. For example, host server 302 can transmit the prompt to client device 304 over network 306. As an example, the prompt can be exemplary recommendation 100 depicted in FIG. 1 and discussed above.

If a plurality of photogenic locations are within the threshold distance from the geographic location received at (404), then one or more of such photogenic locations can be indicated by the prompt sent at (410). A selection can be made among the plurality of photogenic locations based on one or more parameters. For example, the photogenic location that is most proximate to the geographic location received at (404) can be recommended at (410). As another example, the photogenic location that has the greatest global interestingness score can be recommended at (410). As yet another example, the photogenic location that shares the largest number of keywords with a user interest table can be recommended at (410).

Exemplary Method for Clustering Photographs

Figure 5:
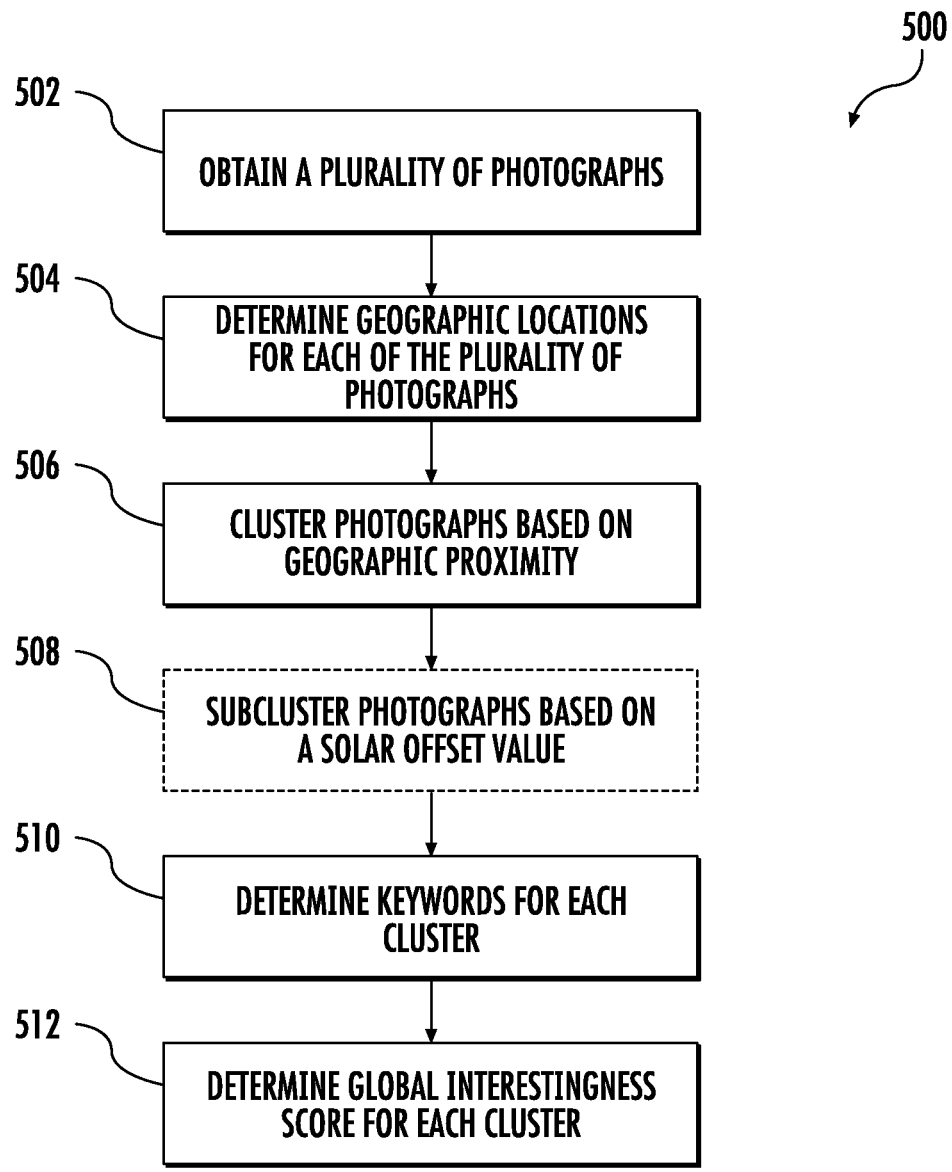
FIG. 5 depicts a flowchart of an exemplary method for clustering a plurality of photographs according to an exemplary embodiment of the present disclosure.

FIG. 5 depicts a flowchart of an exemplary method (500) for clustering a plurality of photographs according to an exemplary embodiment of the present disclosure. Method (500) can be implemented using any suitable computing system. In addition, although FIG. 5 depicts steps performed in a particular order for purposes of illustration and discussion, methods of the present disclosure are not limited to such particular order or arrangement. One skilled in the art, using the disclosures provided herein, will appreciate that various steps of the method (500) can be omitted, rearranged, combined, and/or adapted in various ways without deviating from the scope of the present disclosure.

At (502) a plurality of photographs can be obtained. The plurality of photographs can be obtained from any suitable source or location, including, without limitation, a database storing geotagged photographs, a social media platform, or a geographic information system.

At (504) a geographic location is determined for each of the plurality of photographs. For example, each of the plurality of photographs can be geotagged with geographic location data. In particular, a geotagged photograph can include EXIF data indicating a latitude, longitude, and a timestamp indicating a time and date of capture. As another example, geographic location data can be determined for such photograph based on textual, visual, or contextual analysis. For example, visual feature matching or textual content matching can be performed in order to match a photograph with ambiguous geographic location with a photograph of known geographic location.

At (506) the plurality of photographs can be clustered based on geographic proximity. Suitable clustering algorithms can consider photograph density, user diversity, textual content, visual content, or other suitable parameters. In particular, a density map can be computed and areas with the highest density can be identified as clusters. Alternatively, points in high density areas can be treated as seeds for clusters and the clustering algorithm can work outwards from such seeds to incorporate photographs in a cluster based on a plurality of factors. In addition, prior to clustering, the plurality of photographs can be filtered based on one or more parameters. The result of such clustering can be a plurality of geographic photo clusters respectively associated with a plurality of photogenic locations.

At (508) the plurality of geographic photo clusters can optionally be subclustered based on a solar offset value. As an example, a sunset offset for each photograph can equal the time of sunset on the date of capture of the photograph at the photograph longitude and latitude minus the time of capture of the photograph, expressed in minutes. In particular, the time of sunset on the date of capture of the photograph at the photograph longitude and latitude can be retrieved from a database providing solar information or can be obtained from other suitable sources or calculations.

At (510) keywords can be determined for each cluster. For example, the keywords can generally describe the subject matter, viewpoint, or phenomenon that can be experienced at the location associated with such cluster. Such keywords can be determined based on analyzing textual content associated with the photographs included in a cluster or by any other suitable means. As an example, if the metatags or social media comments for the photographs included in cluster 212 of FIG. 2 repeatedly refer to or use the words "baseball," "stadium," or "sports," then such words can be assigned as keywords to cluster 212.

At (512) a global interestingness score can be determined for each cluster. In particular, a global interestingness score can be determined for each of the plurality of photographs included in a cluster based on one or more signals indicative of online activity associated with such photograph. For example, a signal from one or more social media platforms can describe online activity associated with each of the plurality of photographs. As an example, a signal can be received that indicates the number of instances in which one or more users of such social media network has selected an indicator indicating that such social media user enjoys a photograph. As another example, a signal can be received that indicates the number of comments that were provided when a photograph was posted or shared on the social media platform. Such signal can also indicate a relative positivity or negativity of such comments. As yet another example, a signal can be received that indicates the number of times a second user has shared or rebroadcasted a photograph.

The global interestingness score determined for a particular cluster at (512) can be based on the global interestingness scores respectively associated with the photographs contained in such cluster. For example, the global interestingness score determined for a cluster can be the sum of all scores associated with all photographs included such cluster. As another example, the global interestingness score determined for a cluster can be an average of all scores associated with all photographs included in such cluster. As yet another example, the global interestingness score determined for a cluster can be an average of the top five scores for photographs included in such cluster.

Exemplary Method for Recommending Photogenic Locations

Figure 6:
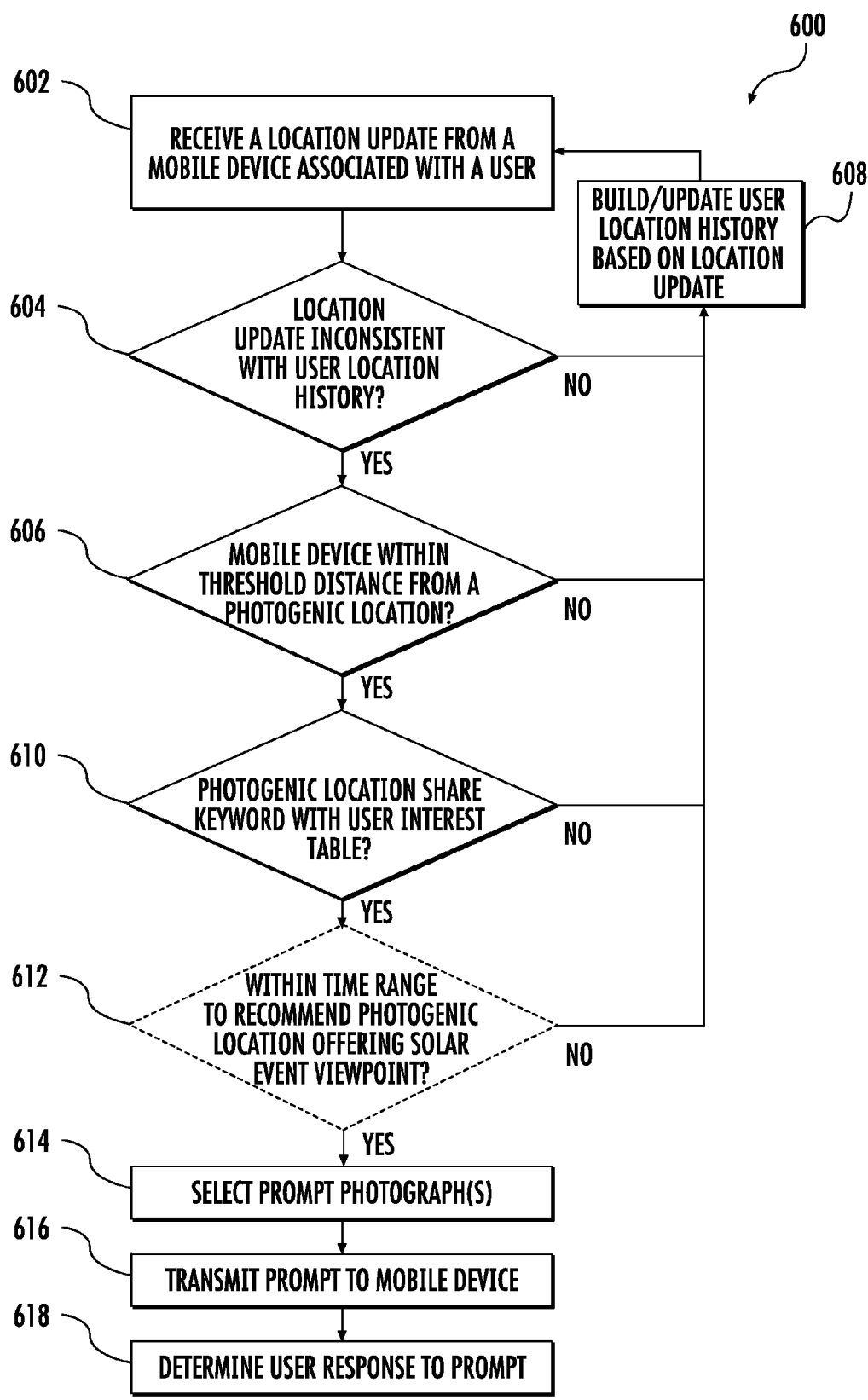
FIG. 6 depicts a flowchart of an exemplary method for recommending a photogenic location according to an exemplary embodiment of the present disclosure.

FIG. 6 depicts a flowchart of an exemplary method (600) for recommending a photogenic location according to an exemplary embodiment of the present disclosure. While exemplary method (600) will be discussed with reference to the system 300 of FIG. 3, method (600) can be implemented using any suitable computing system. In addition, although FIG. 6 depicts steps performed in a particular order for purposes of illustration and discussion, methods of the present disclosure are not limited to such particular order or arrangement. One skilled in the art, using the disclosures provided herein, will appreciate that various steps of the method (600) can be omitted, rearranged, combined, and/or adapted in various ways without deviating from the scope of the present disclosure.

At (602) a location update is received from a mobile device associated with a user. For example, client device 304 can transmit a location update to host server 302 over network 306. Such location update can include a latitude, longitude, and timestamp that indicates a time of day and date. In some implementations, the location update can further include an indication of an estimated accuracy.

At (604) it is determined whether the location update is inconsistent with a user location history. The user location history can be associated with a user of the mobile device (i.e. a user ID) or the user location history can be associated with the mobile device itself. Such user location history can be an aspect of a user profile stored or provided by user profiles database 320.

Thus, at (604) the location update received at (602) is compared with such a user location history. Generally, a geographic location will be inconsistent with a user location history when it indicates that the user is in a location that the user does not usually visit. In particular, even if the user is familiar with such location, he or she may not visit at certain times of day. If the geographic location is inconsistent with the user location history, then method (600) proceeds to step (606).

However, if the location update is not inconsistent (i.e. is consistent) with the user location history, then method (600) proceeds to step (608) and further builds or updates the user location history based on the location update. For example, the location update can be stored to the user profile stored in database 320. After the user location history is updated at (608), method (600) returns to step (602) and awaits the next location update from the mobile device.

At (606) it is determined whether the mobile device is within a threshold distance from at least one photogenic location. For example, the location included in the location update can be compared with photogenic locations associated with clusters of photographs indexed and stored in database 318. If the mobile device is within the threshold distance from at least one photogenic location, method (600) proceeds to step (610). If the mobile device is not within the threshold distance from a photogenic location, then the method proceeds to step (608).

At (610) it is determined whether the photogenic location identified at (606) shares at least one keyword in common with a user interest table. For example, a user interest table can be an aspect of a user profile stored or provided by user profiles database 320. If the user consents, such user interest table can be populated or created based on online activity performed by such user. For example, the content that such user interacts with can be analyzed in order to determine categories or keywords that reflect the user's interests based on such activity.

Further, keywords can be determined for each photogenic location. For example, the keywords can generally describe the subject matter, viewpoint, or phenomenon that can be experienced at the photogenic location. Such keywords can be determined through textual, visual, or contextual analysis. Such keywords can be stored in association with the photogenic location and associated photographic clusters in database 318.

Thus, at (610) the user interest table can be compared with keywords associated with the photogenic location identified at (606). If a keyword is shared in common, then method (600) can proceed to step (612). However, if no keywords are shared in common, then method (600) can proceed to step (608).

At (612) it can optionally be determined whether the current time is within a time range in which it is appropriate to recommend a photogenic location offering a solar event viewpoint. More particularly, certain photogenic locations can be identified as offering a superior viewpoint for a solar event such as a sunrise or sunset. However, in one implementation, such photogenic locations are generally only recommended when such identified solar event is approaching within a reasonable time frame. As a non-limiting example, if the photogenic location to be recommended is expected to offer a superior sunset viewpoint at 6:00 PM, then such photogenic location should only be recommended if the current time is within the time range of 3:00 PM to 6:00 PM.

Thus, at (612) it can be determined whether the current time is within the appropriate time range to recommend a photogenic location offering a solar event viewpoint. For example, host server 302 can compare the current time with expected solar event time obtained from solar information 326. However, one of skill in the art will appreciate that step (612) is only performed if the photogenic location to be recommended is associated with a solar event. Further, in some instances, it may be desirable to recommend such a photogenic location regardless of the current time.

If it is determined at (612) that it is within the appropriate time range to recommend the photogenic location, then method (600) can proceed to step (614). However, if it is determined at (612) that it is inappropriate to recommend the photogenic location, then method (600) can proceed to step (608).

At (614) one or more photographs are selected to be included in a prompt. For example, database 318 can store an index of clustered photographs. Host server 302 can select one or more photographs from all photographs included in the photograph cluster associated with the photogenic location to be recommended. Such selection can be on the basis of one or more factors or parameters. For example, the photograph with the largest global interestingness score can be selected as the prompt photograph at (614). Alternatively, the five photographs with the highest global interestingness scores can be selected and all five can be included in the prompt.

At (616) the prompt is transmitted to the mobile device. For example, host server 302 can transmit the prompt to client device 304 over network 306. As an example, the prompt can be exemplary recommendation 100 depicted in FIG. 1 and discussed above. The prompt can include the one or more prompt photographs selected at (614).

At (618) a user response to the prompt can be determined. For example, subsequent mobile device location updates can indicate whether the user did, in fact, visit the photogenic location recommended. Further, if the user of client device 304 consents, camera 332 and memory 310 of client device 304 can be analyzed in order to determine whether a user that visited the recommended photogenic location indeed took photographs. The number and nature of such photographs can be analyzed. The user response determined at (618) can be used as feedback to improve aspects of the recommendation system. However, a user's client device 304 will not be analyzed without permission.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for recommending photogenic locations, the method comprising:
    identifying, by one or more computing devices, a plurality of photogenic locations by clustering a plurality of photographs based on geographic proximity to form a plurality of geographic photo clusters, each geographic photo cluster being associated with one of the plurality of photogenic locations;
    receiving, by the one or more computing devices, after identifying the plurality of photogenic locations, a signal indicative of a geographic location at which a client device is located;
    determining, by the one or more computing devices, whether the geographic location is within a threshold distance from at least one of the plurality of photogenic locations; and
    transmitting, by the one or more computing devices, a prompt to the client device when the geographic location is within the threshold distance from at least one of the plurality of photogenic locations, the prompt indicating the existence of the at least one photogenic location that is within the threshold distance from the geographic location.

2. The computer-implemented method of claim 1, further comprising subclustering within each geographic photo cluster based on a sunset offset value associated with each photograph to form a plurality of offset subclusters for each geographic photo cluster, the sunset offset value associated with each photograph relating a time of capture of such photograph with a time of sunset at a location of capture on a date of capture of such photograph.

3. The computer-implemented method of claim 2, further comprising identifying one or more geographic photo clusters that includes an offset subcluster that includes photographs with a sunset offset value less than a threshold value and includes a larger number of photographs than any of the other offset subclusters included in such geographic photo cluster.

4. The computer-implemented method of claim 1, further comprising subclustering within each geographic photo cluster based on a sunrise offset value associated with each photograph to form a plurality of offset subclusters for each geographic photo cluster, the sunrise offset value associated with each photograph relating a time of capture of such photograph with a time of sunrise at a location of capture on a date of capture of such photograph.

5. The computer-implemented method of claim 1, wherein the prompt includes data representing a prompt photograph associated with the photogenic location.

6. The computer-implemented method of claim 5, further comprising, prior to transmitting the prompt, selecting the prompt photograph from the geographic photo cluster associated with the photogenic location.

7. The computer-implemented method of claim 6, wherein the prompt photograph is selected from the geographic photo cluster associated with the photogenic location based on a plurality of global interestingness scores respectively associated with the plurality of photographs included in the geographic photo cluster associated with the photogenic location.

8. The computer-implemented method of claim 7, wherein the global interestingness score associated with each photograph is determined based on one or more signals indicative of online activity associated with such photograph.

9. The computer-implemented method of claim 8, wherein the one or more signals indicative of online activity associated with such photograph comprise a signal indicating the number of instances in which one or more social media users has selected an indicator indicating that such social media user enjoys such photograph.

\* \* \* \* \*